United States Patent [19]

Kato

[11] Patent Number: 4,573,781
[45] Date of Patent: Mar. 4, 1986

[54] VIEWFINDER HAVING TWO IMAGE PLANES

[75] Inventor: Masatake Kato, Tokyo, Japan

[73] Assignee: Canon Kabushiki Kaisha, Tokyo, Japan

[21] Appl. No.: 653,968

[22] Filed: Sep. 24, 1984

[30] Foreign Application Priority Data

Sep. 29, 1983 [JP] Japan ................... 58-150805

[51] Int. Cl.$^4$ .................. G03B 3/00; G03B 13/06
[52] U.S. Cl. .......................... 354/201; 354/225
[58] Field of Search ............ 354/155, 224, 225, 200, 354/201

[56] References Cited

U.S. PATENT DOCUMENTS 3,230,851 1/1966 Reymond .................. 354/155

FOREIGN PATENT DOCUMENTS 784014 10/1957 United Kingdom ............ 354/225

*Primary Examiner*—John Gonzales
*Attorney, Agent, or Firm*—Toren, McGeady, Stanger, Goldberg & Kiel

[57] ABSTRACT

In the disclosed finder, a half transparent surface positioned behind a photographic lens splits off part of the light passing through the photographic lens to a first image plane at a position equivalent to a focal plane of the photographic lens. At least two lens components refocus light from the first image plane onto a second image plane conjugate to the first one. An image on the second plane is observed through an eyepiece. An even number of reflective surfaces, but not less than four, including the half transparent surface, are arranged in an optical path from the photographic lens to the eyepiece and at least one of these reflective surfaces lies between the two lens components. A decrease in the physical length of the finder and an increase in the image magnification are achieved.

5 Claims, 8 Drawing Figures

VIEWFINDER HAVING TWO IMAGE PLANES

BACKGROUND OF THE INVENTION

1. Field of the Invention

This invention relates to optical finders for still cameras, electronic cameras and video cameras.

2. Description of the Prior Art

Two types of optical finders are known: one is the external type widely used in leaf shutter type cameras; the other is the through-the-lens (TTL) type used in the single lens reflex cameras, 8 mm cameras and cine cameras. Most high quality cameras employ a TTL finder because it is superior to the external type in avoiding parallax between the actual and apparent fields of view. Many video cameras employ an electronic viewfinder for reproducing an image using output signals from an image pickup tube. Compared to the optical finder, the electronic finder has advantageous aspects because it is susceptible to monitoring. Drawbacks to the electronic finder are poor accuracy of distance measurement due to low resolving power, far larger bulk and size, and high consumption of electrical energy. Therefore, it is debatable whether the optical or electronic finder is superior. In either case, however, higher brightness and greater image magnification are desirable.

The TTL optical finders may be further divided into a primary imaging type used in the single lens reflex camera and another or secondary imaging type used in the 8 mm camera or cine camers. In the primary imaging type, a first image at a plane equivalent to a prescribed focal plane of the photographic lens, for example, the film plane, is viewed through an eyepiece, so that the image magnification is determined by the focal lengths of the photographic lens and the eyepiece. On the other hand, the finder of the secondary imaging type is constructed with a first image plane equivalent to the focal plane of the photographic lens, a second image plane conjugate to the first image plane with respect to an optical system therebetween and an eyepiece through which an image on the second plane is observed.

FIG. 1 illustrates an example of a prior known finder of the primary imaging type used in the single lens reflex camera. Light entering and emerging from a photographic lens 1 is reflected upward by a quick return mirror 3 positioned at an angle of 45° to an optical axis 2 to form a first image on a focusing screen 5 in equivalent position to a film plane 4. Light from the image on the focusing screen 5 is successively reflected from two roof type reflective faces a1 and a2 and a front face "b" of a pentagonal roof type prism 6 to an eyepiece 7, and reaches a pupil 8. In this case, since the focal length of the eyepiece is restricted because of the air reduced length of the optical path from the first image plane through the pentagonal roof type prism to the front principal point of the eyepiece, a much desired decrease is not possible. Therefore, it has the drawback that the image magnification is low.

FIG. 2 illustrates an example of the prior known finder of the secondary imaging type used in the 8 mm camera or cine camera. An afocal light beam emerging from a zoom section 11 of a photographic lens system enters a half prism 13 and is split into two parts by a reflective surface 14 of the half prism 13 positioned at an angle of 45° to an optical axis 12 of the photographic lens. One part goes upward, and the other part passes through a relay lens 22 to focus on a film plane 23. The light beam moving upwardly from the reflective surface 14 is focused by an objective lens 15 onto a first image plane 16. Light from the image on the first plane 16 is reflected by a total reflection mirror 17 to parallel the optical axis 12 and is focused by an erector lens 18 onto a second image plane 19. Light from this image on the second plane 19 passes through an eyepiece 20, reaching a pupil 21.

The secondary imaging type finder can include a lens system (in the finder of FIG. 2, lens 18) for enlarging the first image to the second image for the purpose of increasing the image magnification. Additionally, since the focal length of the eyepiece is not subject to restriction by the air reduced length of the optical path of the pentagonal roof type prism as in the example of FIG. 1, the image magnification can be further increased by shortening the focal length of the eyepiece. However, there is the drawback that the finder optical system of FIG. 2 has an increased complexity of structure, physical length, bulk and size. In the system of FIG. 2, where the half prism for splitting off an optical path of the finder is positioned intermediate the physical length of the photographic lens, the drawback is not great. However, when the half prism is positioned behind the photographic lens just in front of the film plane, the finder system projects rearward of the film plane to a great degree. Accordingly, the camera as a whole becomes very large and extremely awkward. Thus, such a finder is unsuitable for use in the single lens reflex camera. Particularly, in interchangeable lens-equipped cameras, it is very difficult for the optical path of the finder to emerge at an intermediate point in the photographic lens without requiring a very elaborate and troublesome structure to interchange the photographic lens at the front assembly of lens elements.

SUMMARY OF THE INVENTION

A first object of the present invention is to provide a TTL viewfinder having two image planes.

A second object is to increase the magnifying power of the viewfinder.

A third object is to achieve a minimization of the bulk and size of the viewfinder.

To achieve these objects, according to the present invention, an even number of reflective surfaces, not less than four, including reflective surfaces in a light beam splitter, are arranged in a split optical path from a point at which the optical paths of a photographic lens and a finder split away from each other to an eyepiece. At least one of the reflective surfaces is positioned between two lens components constituting at least part of a system for forming a second image.

DETAILED DESCRIPTION OF THE PREFERRED EMBODIMENTS

Figure 1:
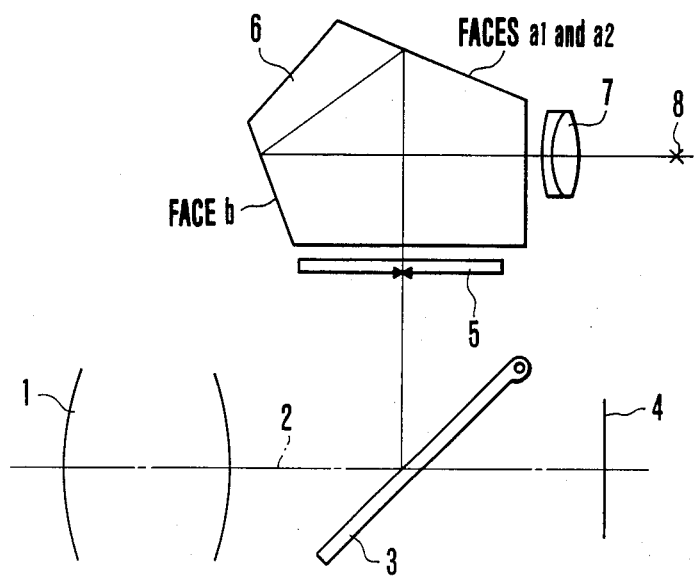
FIG. 1 is a schematic longitudinal section view of a prior known finder optical system in a single lens reflex camera.
Figure 2:
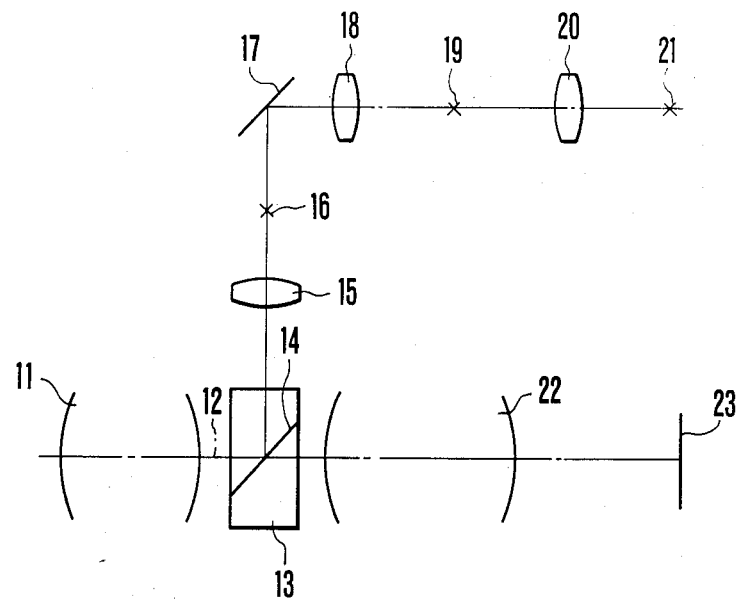
FIG. 2 is a schematic longitudinal section view of a prior known finder optical system in a cine camera.
Figure 3:
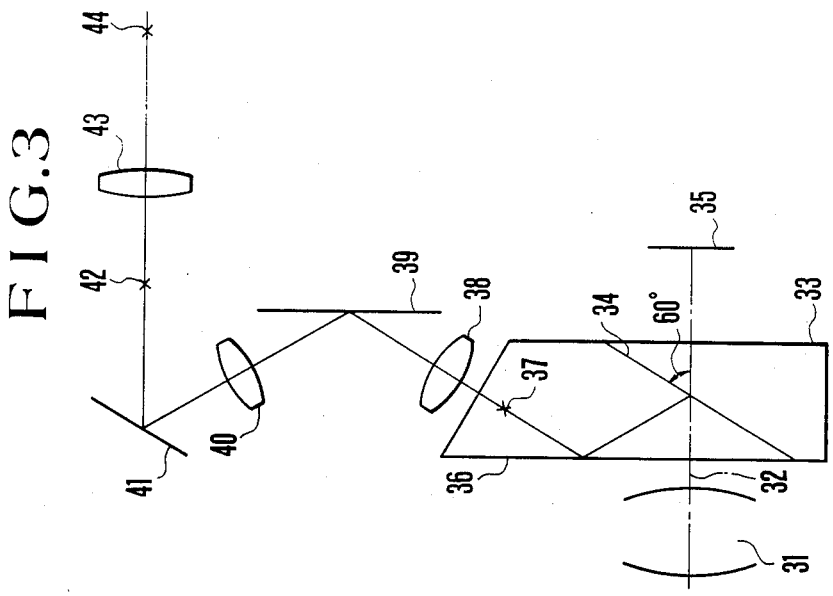
FIG. 3 is a schematic diagram of the optics of a first embodiment of the present invention.

The embodiment illustrated in FIG. 3 will now be described. Light passes through a photographic lens 31 and is split into a photographic light and a finder light by a half transparent mirror layer 34 having a half prism 33 positioned behind it. The photographic light passes straight through the half prism 33 to focus on a film plane 35. The half transparent mirror layer 34 for splitting off the finder light is positioned at an angle of 60 degrees to an optical axis 32 of the photographic lens. The finder light from this layer 34 is perfectly reflected from a front face 36 of the half prism 33 to form a first image on a plane 37 in a position equivalent to that of the film plane 35. This image on the plane 37 may be in the air, and, therefore, the first image plane 37 may be formed in the half prism 33. Such an arrangement of the first image plane after two reflections allows for a steeper inclination of the optical path splitting half transparent mirror layer 34 than the 45° angle of inclination when there is only one reflection, as in the case of FIG. 2. This provides the advantage that the axial thickness of the half prism can be reduced to split off a light bundle having an equivalent diameter.

The image on the first image plane is focused on the second image plane by two lenses 38 and 40. As shown in the drawing, a total reflection mirror 39 is positioned between the lenses 38 and 40 perpendicular to the optical axis 32 of the photographic lens. The reflected light from mirror 39 passes through the lens 40 to another total reflection mirror 41, where it is reflected again parallel to the optical axis 32 of the photographic lens 31 and focused on the second image plane 42. These lenses 38 and 40 are each preferably constructed of a plurality of elements for the purpose of minimizing the various aberrations.

In the above-described construction and arrangement of the constituent parts, the angle the half permeable mirror layer 34 makes with the optical axis 32 is 60 degrees. However there is no need to confine that angle to this value. The angle may be any value provided that the next reflective surface (in the finder of FIG. 3, the surface 36) functions to perfectly reflect light. By such a construction, a length of the optical path is eliminated which shortens the size of the finder along the optical axis 32.

Figure 4:
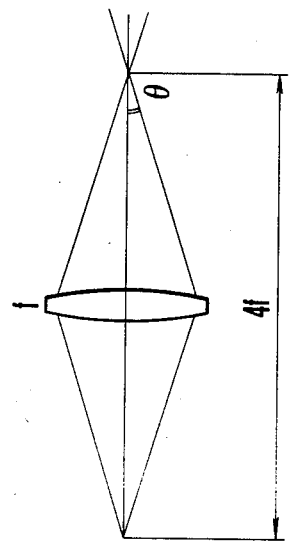
FIGS. 4 and 5 illustrate the predesign of the second image forming lens system of FIG. 3.

Considering only the section between the first and second image planes, the ratio of the size of the first image to that of the second image is generally in a range of 0.6 to 1.5. Where the ratio is, for example, unity, the distance between the first and second image planes is 4f where f is the focal length of a lens system lying therebetween. In FIG. 4, $\theta$ denotes the opening angle of a paraxial ray, which depends on the eyepiece and the size of the pupil. When a lens unit is located at the center, as shown in FIG. 4, the diameter of the lens unit is considerably increased to obtain the required value of the opening angle $\theta$.

Figure 5:
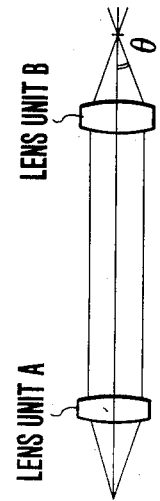

Accordingly, as shown by the lens units 38 and 40 in the above-described embodiment of the invention, the lens for relaying the first image plane to the second image plane is divided into two units A and B arranged in tandem as shown in FIG. 5. The diameter of each of the lens units A and B, determined by the required opening angle $\theta$, is small. When such a tandem arrangement of the lens units A and B is employed, it is most effective from the standpoint of spatial economy to put a reflective surface (indicated at 39 in FIG. 3) between these lenses. The finder of FIG. 3 is based on such principle of design.

Figure 6:
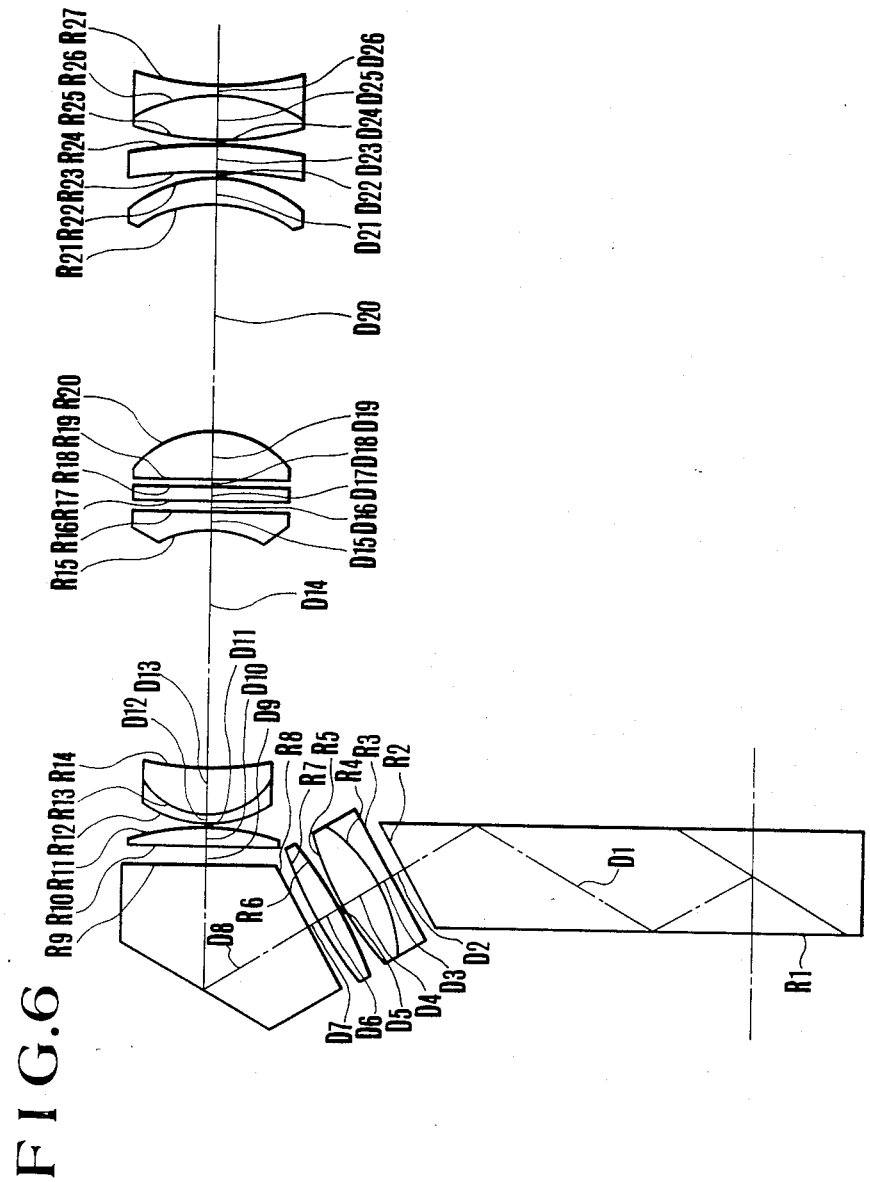
FIG. 6 is a block diagram of a specific example of a second embodiment of the invention.

FIG. 6 illustrates another embodiment of the invention obtained by specifying the constituent parts shown in FIG. 3, the numerical data for which is given in the following table. In this embodiment, Ri denotes the radius of curvature (+ is taken in the direction in which light advances) of the i-th optical member surface counting from the front; Di the i-th optical member thickness or air separation counting from the front; and Ni and Vi the refractive index and Abbe number of the glass of the i-th optical member counting from the front.

| | | | |
|---|---|---|---|
| R1 = ∞ | D1 = 43.48 | N1 = 1.51633 | V1 = 64.10 |
| R2 = ∞ | D2 = 1.45 | | |
| R3 = 769.013 | D3 = 1.0 | N2 = 1.834 | V2 = 37.2 |
| R4 = 12.444 | D4 = 4.0 | N3 = 1.54739 | V3 = 53.6 |
| R5 = −27.782 | D5 = 0.15 | | |
| R6 = 37.282 | D6 = 1.7 | N4 = 1.51633 | V4 = 64.10 |
| R7 = −123.684 | D7 = 1.5 | | |
| R8 = ∞ | D8 = 23.0 | N5 = 1.51633 | V5 = 64.10 |
| R9 = ∞ | D9 = 1.5 | | |
| R10 = 418.588 | D10 = 2.2 | N6 = 1.60311 | V6 = 60.7 |
| R11 = −23.049 | D11 = 0.15 | | |
| R12 = 14.155 | D12 = 1.0 | N7 = 1.80518 | V7 = 25.4 |
| R13 = 8.482 | D13 = 4.2 | N8 = 1.60311 | V8 = 60.7 |
| R14 = 65.792 | D14 = 22.53 | | |
| R15 = −9.12 | D15 = 1.0 | N9 = 1.7725 | V9 = 49.6 |
| R16 = ∞ | D16 = 0.65 | | |
| R17 = ∞ | D17 = 1.53 | N10 = 1.51633 | V10 = 64.1 |
| R18 = ∞ | D18 = 0.6 | | |
| R19 = ∞ | D19 = 4.5 | N11 = 1.804 | V11 = 46.6 |
| R20 = −9.999 | D20 = 20 | | |
| R21 = −13.541 | D21 = 2.5 | N12 = 1.60311 | V12 = 60.7 |
| R22 = −12.770 | D22 = 0.15 | | |
| R23 = −83.756 | D23 = 3.3 | N13 = 1.60311 | V13 = 60.7 |
| R24 = −33.338 | D24 = 0.15 | | |
| R25 = 21.625 | D25 = 4.6 | N14 = 1.60311 | V14 = 60.7 |
| R26 = −17.208 | D26 = 1.0 | N15 = 1.71736 | V15 = 29.5 |
| R27 = 74.842 | | | |

This embodiment has four reflections, the first image plane at a distance of 20.47 mm measured from the first surface, and the refracting surfaces R19 to R27 constituting an eyepiece having a focal length fe=19.97. The plain surfaces R17 and R18 define a focusing screen positioned in coincidence with the second image plane.

Figure 8:
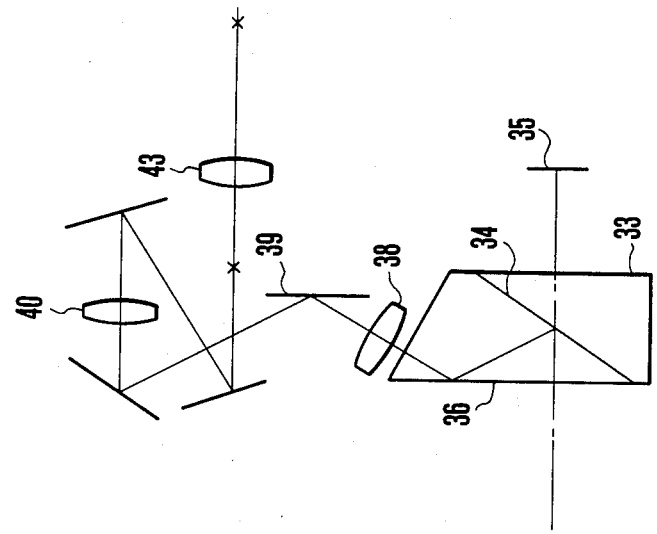
FIG. 8 is a schematic sectional view of a fourth embodiment of the invention.
Figure 7:
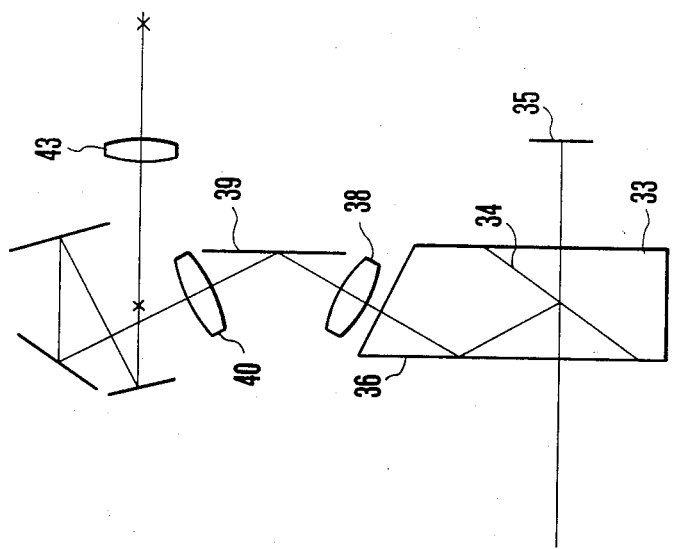
FIG. 7 is a schematic sectional view of a third embodiment of the invention.

FIGS. 7 and 8 illustrate another two embodiments of the present invention, each of which has six reflections. FIG. 8 is different from FIG. 7 in the arrangement of the lens unit A (38) and the lens unit B (40). Another difference is that in FIG. 8 there are two reflective surfaces between the lens units A and B.

In the finder optical system according to the present invention, as has been described above, four, or a greater even number of, reflective surfaces are arranged in the optical path from the photographic lens to the eyepiece. At least two lens components separated from each other are located between the first and second image planes and at least one of the even number of reflective surfaces is arranged between the separated lens components. Accordingly, the eyepiece observes an erected image, the finder optical system is not unduly long in the longitudinal direction, and it is possible to narrow the width of the optical path, while nevertheless achieving a great increase in the image magnification. Thus, a secondary imaging type finder of small size and simple construction is realized. Since the finder of the present invention is set up behind the rear vertex of the photographic lens, it will be understood that the present invention is applicable to cameras having interchangeable lenses.

What is claimed is:

1. A viewfinder for observation through a photographic lens of a camera comprising:

optical path splitting means for splitting an optical path of the photographic lens on the image side of said photographic lens;

light conducting means for conducting light through an even number of reflections of at least four, including reflections by said optical path splitting means;

lens units arranged to sandwich a reflective surface at which at least one of said reflections occur and to cooperate with each other to relay an image formed by the photographic lens; and an eyepiece for observing the relayed image.

2. A viewfinder according to claim 1, wherein said optical path splitting means is a half transparent mirror, and said light conducting means includes a prism incorporating said half transparent mirror and one total reflection surface, and a plurality of reflective surfaces.

3. A viewfinder according to claim 1, wherein said optical path splitting means is a half transparent mirror, and said light conducting means includes a prism incorporating said half transparent mirror and two total reflection surfaces, and at least one reflective surface.

4. A viewfinder according to claim 1, wherein said optical path splitting means is a reflective surface positioned at substantially 60 degrees to an optical axis of said photographic lens.

5. A viewfinder according to claim 1, further comprising:

a focusing screen positioned where said relayed image is formed.

* * * * *